(12) United States Patent
Petersen

(10) Patent No.: US 7,493,873 B2
(45) Date of Patent: Feb. 24, 2009

(54) REMOVABLE RESTRAINT AND ANCHOR

(75) Inventor: Troy Petersen, Rosemount, MN (US)

(73) Assignee: Royal Pet Incorporated, Inver Grove Heights, MN (US)

( * ) Notice: Subject to any disclaimer, the term of this patent is extended or adjusted under 35 U.S.C. 154(b) by 0 days.

(21) Appl. No.: 11/478,182

(22) Filed: Jun. 28, 2006

(65) Prior Publication Data
US 2008/0000430 A1    Jan. 3, 2008

(51) Int. Cl.
*A01K 1/04* (2006.01)
(52) U.S. Cl. ...................................... 119/789
(58) Field of Classification Search ............... 119/786, 119/780, 781, 787, 788, 789, 790, 791, 796
See application file for complete search history.

(56) References Cited

U.S. PATENT DOCUMENTS

| | | | | |
|---|---|---|---|---|
| 3,123,052 | A * | 3/1964 | Marshall | 119/789 |
| 4,187,996 | A * | 2/1980 | Ehrlich | 242/382.6 |
| 4,546,730 | A | 10/1985 | Holland | 119/117 |
| 4,796,566 | A | 1/1989 | Daniels | 119/124 |
| 5,022,351 | A | 6/1991 | Daniels | 119/124 |
| 5,031,577 | A | 7/1991 | Flugger | 119/117 |
| 5,161,487 | A | 11/1992 | Miller | 119/121 |
| 5,353,747 | A | 10/1994 | Fain | 119/120 |
| 5,377,626 | A * | 1/1995 | Kilsby et al. | 119/796 |
| 5,526,774 | A | 6/1996 | Swindall, Jr. et al. | 119/787 |
| 5,732,659 | A | 3/1998 | Wiggins | 119/787 |
| 6,318,302 | B1 | 11/2001 | Bedient | 119/786 |
| 6,523,500 | B1 * | 2/2003 | Zenteno | 119/796 |
| 6,612,263 | B2 | 9/2003 | Scheid et al. | 119/787 |
| 6,629,511 | B2 | 10/2003 | De Bien | 119/776 |
| 6,820,573 | B1 | 11/2004 | McMullin | 119/791 |
| 6,955,138 | B2 | 10/2005 | DeBien | 119/776 |
| 2003/0205647 | A1 | 11/2003 | Boucher | 248/156 |
| 2007/0181079 | A1 * | 8/2007 | Fong | 119/786 |

FOREIGN PATENT DOCUMENTS

DE     2745563 A   *  4/1979
WO  WO 2006116880 A1 * 11/2006

* cited by examiner

*Primary Examiner*—Son T. Nguyen
(74) *Attorney, Agent, or Firm*—Westman, Champlin & Kelly, P.A.

(57) ABSTRACT

An apparatus for tethering an animal to a selected area or retaining the animal while exercising includes an anchor having a bottom portion for positioning into the ground and a top portion for positioning above the ground. The apparatus also includes a restraint having a housing with a receptacle and a lead. A proximal end of the lead is secured within the housing and a distal end is attached to the animal. The housing is positioned onto the top portion by lowering the housing such that the top portion positions within the receptacle. The apparatus includes a retaining mechanism that removably secures the housing to the top portion of the anchor such that the housing rotates about an axis of the top portion of the anchor to tether the animal in a selected area. The retaining mechanism is disengaged from the anchor such that the restraint can be utilized to exercise the animal.

16 Claims, 3 Drawing Sheets

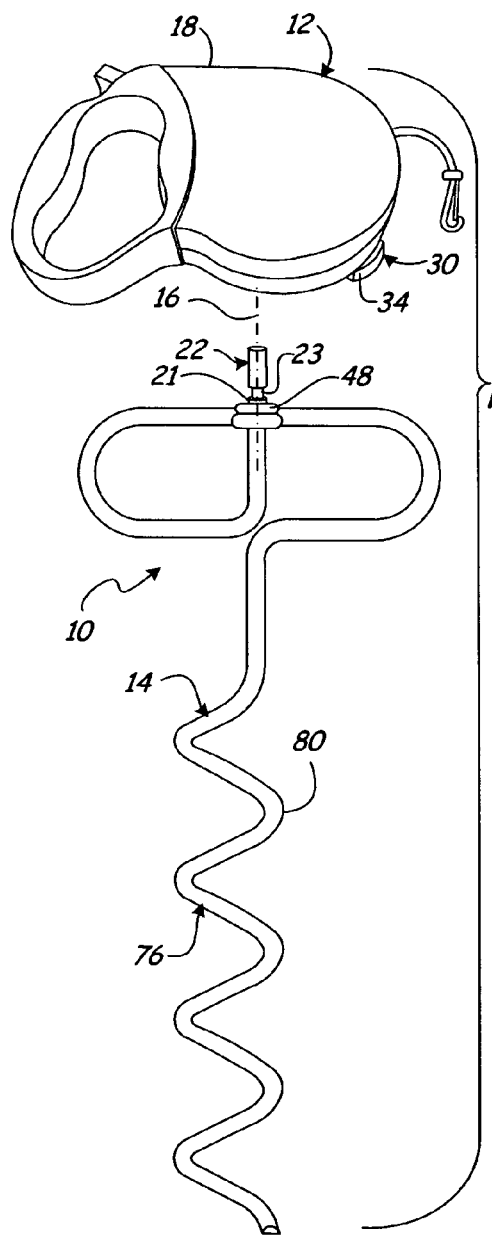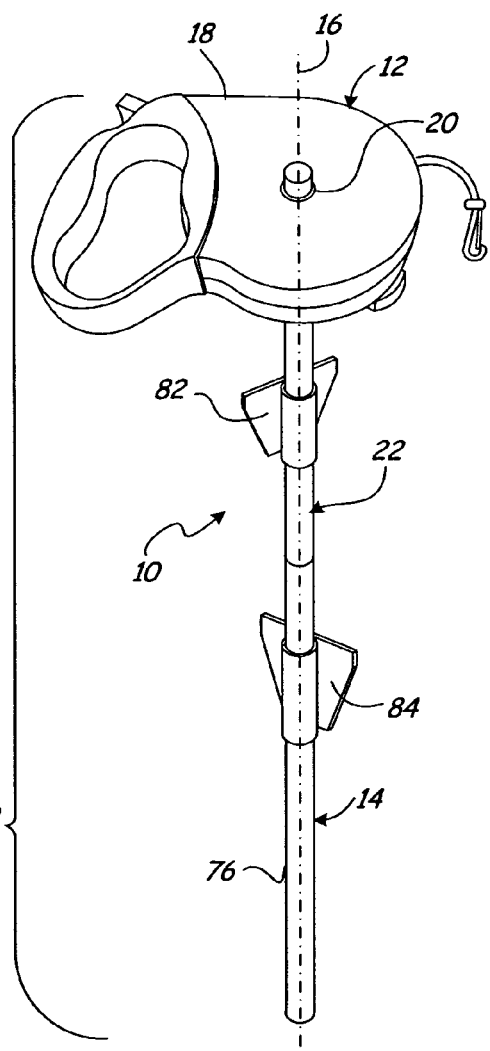

REMOVABLE RESTRAINT AND ANCHOR

BACKGROUND OF THE INVENTION

The present invention relates to a restraint for an animal. More particularly, the present invention relates to a restraint that removably engages an anchor.

Dogs are one of the most popular household pets and are typically exercised by taking the dog on a walk. During the walk, the dog's movement is typically limited by a hand-held restraint such as a leash to prevent the dog from running freely, and into dangerous situations. In many cities, ordinances require a restraint be attached to the dog when the dog is not on the owner's property.

Many restraints are a fixed length and provide adequate control of the dog's movement. However, a fixed length restraint is easily tangled in an obstacle when the restraint is slack. Also, the fixed length restraint does not provide the dog much freedom of movement because the restraint is typically short to prevent the restraint from becoming entangled in obstacles.

Retractable restraints have become more popular in controlling a dog's movement on a walk. The restraint typically includes a lead that is biased onto a reel within a housing where the lead is retracted onto the reel such that the lead remains taut during the walk while not impeding the dog's movement.

While the retractable restraint provides advantages over the fixed length restraint, neither restraint is practical in tethering the dog to an area in the event that the walker decides to rest for an extended period of time and does not want to continuously grasp the restraint. Also, a restraint is not practical to provide a tether while at a picnic, on vacation or any other outdoor activity spent away from an enclosed area because the pet owner would have to continuously grasp the restraint.

SUMMARY OF THE INVENTION

The present invention includes an apparatus for tethering an animal to a selected area or restraining the animal while exercising. The apparatus includes an anchor having a bottom portion for positioning into the ground and a top portion for positioning above the ground. The apparatus also includes a restraint that is removably secured to the top portion of the anchor by positioning a receptacle within a housing of the restraint around the top portion. With the housing positioned on the top portion of the anchor, a retaining mechanism that is integral to either the housing or the top portion removably secures the housing to the top portion of the anchor such that the housing is rotatably secured to the top portion of the anchor to tether the animal in a selected area. The retaining mechanism is disengaged from the top portion of the anchor so that the restraint can be removed from the anchor and utilized as a hand-held restraint when exercising the animal.

BRIEF DESCRIPTION OF THE DRAWINGS

FIG. 1 is a perspective view of an embodiment of a restraint of the present invention detached to an embodiment of an anchor.

FIG. 2 is another perspective view of another embodiment of the removable restraint of the present invention detached from another embodiment of the anchor.

DETAILED DESCRIPTION OF ILLUSTRATIVE EMBODIMENTS

Figure 3:
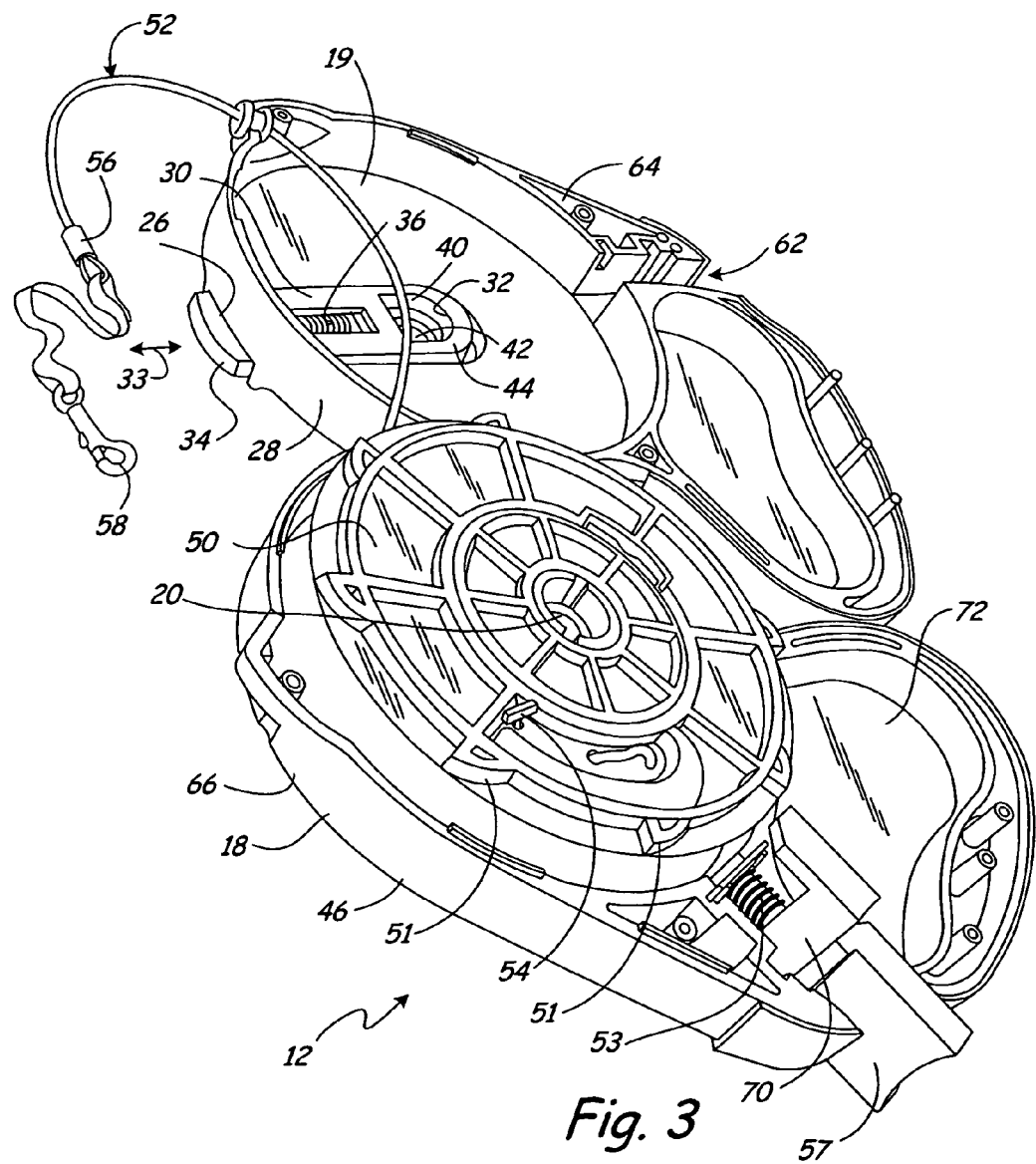
FIG. 3 is a partial exploded view of the restraint of the present invention.

An apparatus of the present invention that is utilized either as a hand-held restraint or as a tether is generally illustrated at 10 in FIG. 1. The apparatus 10 includes a restraint 12 that can be utilized to restrain an animal, such as a dog, that is being exercised. While the apparatus 10 is typically utilized to secure a dog, the apparatus can also be utilized to secure other animals. The restraint 12 can also be attached to an anchor 14 to utilize the apparatus 10 as a tether as illustrated in FIG. 2.

In this application a restraint is defined as a hand-held device that includes a lead that has an end that is attached to a collar or harness being positioned on the animal and another end secured to or within a hand-held housing where the lead restricts the movement of the animal. The lead can be a fixed length or can be a variable length by retracting the lead into a housing.

In this application a tether is defined as a device that includes a lead that has one end attached to an anchor and the other end attached to the collar or harness positioned on the animal. The tether is utilized to retain an animal within an area in which the animal can move. In the application an anchor is defined as a device that has a portion that penetrates the ground such that the device is retained in a selected position or an object of a sufficient weight such that the animal cannot move the object when tethered to the object.

Referring to FIGS. 1 and 2, the apparatus 10 is utilized as a tether by rotatably securing the restraint 12 directly to the anchor 14 such that the restraint 12 rotates about a central axis 16 of the anchor 14. The restraint 12 is positioned onto the anchor 14 by aligning a receptacle 20 within a housing 18 of the restraint 12 with a top portion 22 of the anchor 14, and lowering the housing 18 onto the top portion 22 of the anchor 14.

Figure 4:
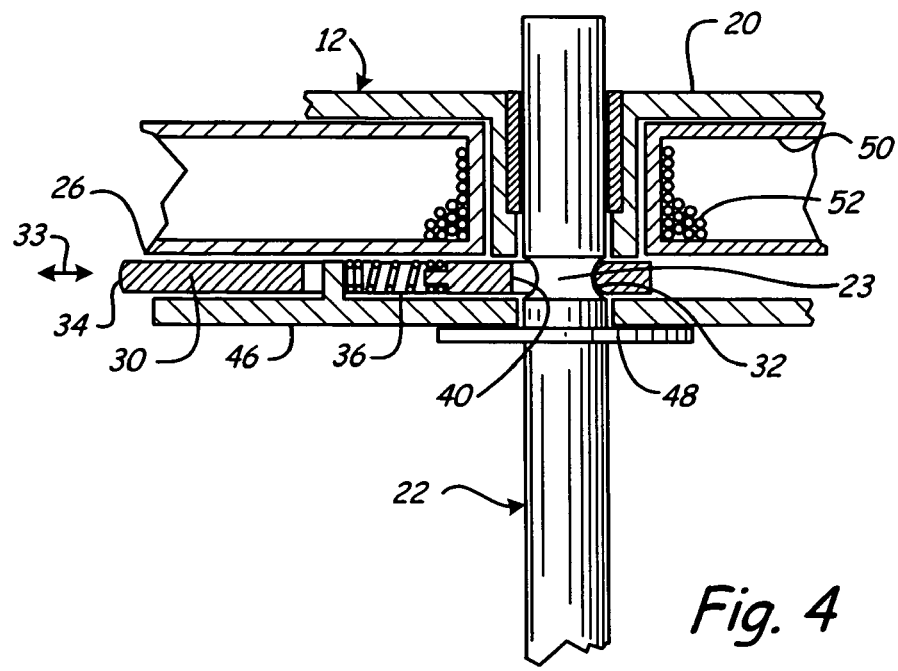
FIG. 4 is a sectional view of the embodiment of the restraint of the present invention.
Figure 5:
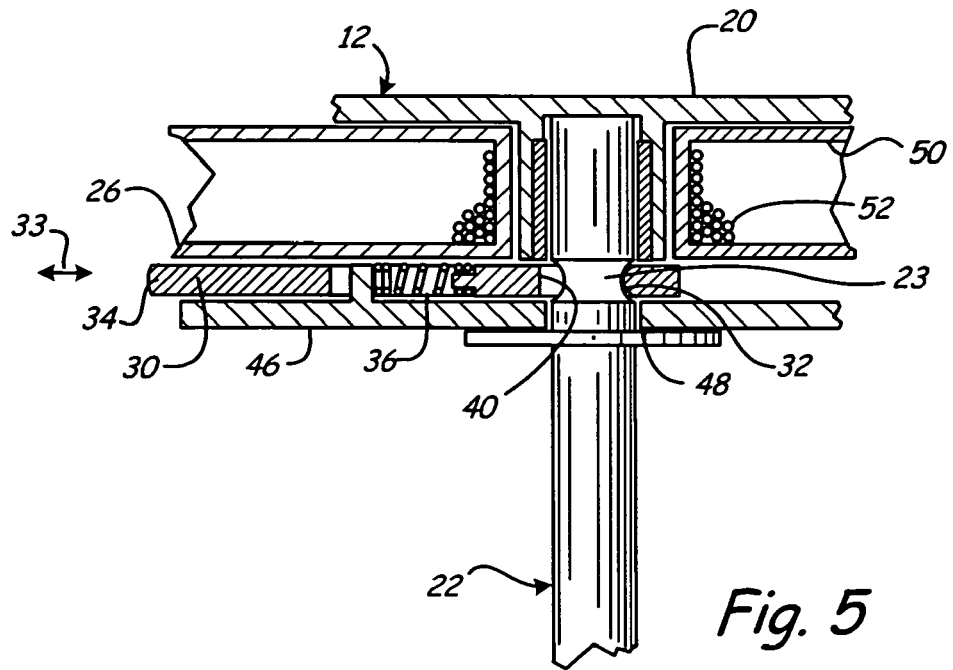
FIG. 5 is a sectional view of another embodiment of the restraint of the present invention.

The receptacle 20 typically includes a through bore with open ends as illustrated in FIGS. 2 and 4 or a cavity with a closed upper end as illustrated in FIGS. 1 and 5. Other configurations of the receptacle 20 are also within the scope of the present invention where the receptacle 20 is integral with the housing 18 and allows the housing 18 to rotate about the central axis 16 of the anchor 14.

Referring to FIGS. 3-5, prior to positioning the housing 18 onto the top portion 22, an engaging surface 32 of a latch 30 is displaced from the receptacle 20 with manual force that is placed upon a force providing end 34 of the latch 30 generally in a direction of arrows 33. The latch 30 is slidably retained within a cavity 19 of the housing 18 where the force providing end 34 extends from a slot 26 in a perimeter 28 of the housing 18. As manual force is exerted upon the force providing end 34, the force overcomes a bias a compression spring 36 having an end engaging the housing 18 and another end engaging the latch 30 where the force displaces the engaging surface 32 from the receptacle 20 such that the receptacle 20 is unobstructed for accepting the top portion 22 of the anchor 14.

The engaging surface 32 is a portion of a surface 40 defining a slot 42 proximate an engaging end 44 of the latch 30. As the latch 30 is moved to displace the engaging surface 32 from the receptacle 20, the slot 42 aligns with the receptacle 20 to provide the unobstructed receptacle for positioning the housing 18 onto the top portion 22.

The housing 18 is lowered onto the top portion 22 until a bottom surface 46 of the housing 18 engages a washer 48 welded to the top portion 22. When the bottom surface 46 engages the washer 48, the engaging surface 32 of the latch 30 aligns with an annular groove 23 within a perimeter 21 of the top portion 22 of the anchor 14. Manual force is removed from the gripping end 34 of the latch 30 and the compression spring 36 biases the engaging surface 32 of the latch 30 into the annular groove 23. The engagement of the engaging surface 32 within the annular groove 23 removably and rotatably attaches the housing 18 directly to the anchor 14 such that the housing 18 rotates about the central axis 16 of the anchor 14.

By a direct attachment is meant an attachment that occurs between two members, such as the restraint and the anchor, without the utilization of an intermediate third component or member between the two members. By rotatable attachment is meant rotational movement about an axis with substantially no linear movement. By linear movement is meant movement that changes a distance between an object and a reference point, such as the axis of rotation.

To remove the restraint 12 from the anchor 14, sufficient manual force is placed upon the gripping end 34 of the latch 30 to overcome the bias of the compression spring 36 and displace the engaging surface 32 of the latch 30 from the annular groove 23. With the engaging surface 32 disengaged from the annular groove 23, the restraint 12 is lifted from the top portion 22 and disengaged from the anchor 14. With the restraint 12 disengaged from the anchor 14, the restraint 12 is utilized to exercise or walk the dog.

Typically, the retaining mechanism, such as the latch 30, is slidably retained within the housing 18 and is integral to the restraint 12 such that the retaining mechanism cannot be removed from the housing 18 and thereby misplaced. However, the retaining mechanism may also be integral to the anchor 14 and may include a spring loaded pin or a spring loaded wedge, wherein the retaining mechanism engages a surface of the housing 18 to retain the restrain 12 to the anchor 14. Having the retaining mechanism integral with either the restraint 12 or the anchor 14 limits the number of components that are required to be carried on a walk or other activity and also limits the likelihood the retaining mechanism being lost or forgotten. However, a non-integral retaining mechanism such as a nut threadably engaging the anchor or a pin positioned through a bore in the anchor is also within the scope of the present invention.

The restraint 12 typically includes a reel 50 rotatably secured within the cavity 19 of the housing 18. A proximal end 54 of a lead 52 is secured to the reel 50 wherein the reel 50 is biased to retract the lead 52 onto the reel 50 with a coil spring (not shown) having one end engaging the reel 50 and another end engaging the housing 18. A distal end 56 of the lead 52 includes a clip 58 that attaches to a collar or a harness that is positioned on the animal.

The lead 52 is positioned through an aperture 62 in housing halves 64, 66 that define the housing 18 and the cavity 19. The lead 52 slides through the aperture 62 to extend and retract depending upon the dog's movement.

The housing 18 also includes a lock 70 that engages the reel 50 to maintain the lead 52 at a selected length. The lock 70 engages teeth 51 extending from a perimeter of the reel 50 by applying manual force to the lock 70 to overcome a bias of a compression spring 42 to position a notch into a cutout in the housing 18. The lock 70 is disengaged from the reel 50 by applying manual force in a direction that displaces the notch from the cutout such that a compression spring 53, that engages the housing 18 and the lock 70, forces the lock 70 away from the teeth 51.

The housing 18 also includes an elongated aperture 72 for accepting the digits of the user's hand. The elongated aperture 72 typically includes indentions 74 for separating the digits and providing a comfortable gripping surface for the user. Typically the surface defining the elongated aperture 72 is coated with a rubberized material to provide a comfortable gripping surface for the digits.

Referring to FIG. 1, the upper portion 22 and the lower portion 76 of the anchor 14 are typically of unitary construction. Referring to FIG. 2, the anchor 14 may also include separate upper portion 22 and a separate lower portion 76 that are secured to each other to define a rigid anchor 14. The lower portion 76 typically includes a threaded upper end that engages a thread cavity in the top portion 22 to threadably secure the top and lower portions 22, 76 to each other.

Referring to FIG. 1, the bottom portion 76 may include a helical screw 80 that is rotated about the axis 16 and penetrates into the ground to secure the anchor 14 in a selected position. Referring to FIG. 2, the lower portion 76 can also include upper and lower wing portions 82, 84 that extend from the lower portion 76 in a substantially orthogonal arrangement to each other where the user steps on the upper wing portion 82 to force the bottom portion 76 into the ground such that the anchor 14 is non-rotatably secured into the ground. Other devices for securing the bottom portion 76 into the ground are also within the scope of the present invention including, but not limited to, a straight shaft.

Although the present invention has been described with reference to preferred embodiments, workers skilled in the art will recognize that changes may be made in form and detail without departing from the spirit and scope of the invention.

What is claimed is:

1. An apparatus for tethering an animal to a selected area or restraining the animal while exercising, the apparatus comprising:

an anchor having a bottom portion for positioning into the ground and a top portion for positioning above the ground where the top portion comprises an annular groove;

a restraint comprising a housing with a receptacle for positioning the housing about the top portion of the anchor and a lead having a proximal end secured within the housing and a distal end for securing to the animal; and a retaining mechanism slidably retained within the housing, the retaining mechanisms comprising:

a latch slidably engaging the housing and having a proximal end extending from an outer surface of the housing and a surface defining a slot proximate a distal end and wherein an engaging portion of the surface defining the slot positions within the receptacle; and a compression spring having a first end engaging the housing and a second end engaging the latch wherein manual force moves the proximal end of the latch toward the housing such that the surface defining the slot is displaced from the receptacle wherein when manual force is removed from the latch, the compression spring forces the engaging portion of the surface defining the slot into the annular groove to retain the housing to the upper portion of the anchor and wherein the latch removable engages the annular groove in the anchor such that when the latch engages the annular groove of the anchor, the housing is rotatably secured to the top portion of the anchor to tether the animal in the selected area and when the latch is moved to disengage the latch from the annular groove of the anchor, the restraint is removable from the anchor and utilized as a hand-held restraint to the animal when exercised.

2. The apparatus of claim 1 and wherein the restraint further comprises a reel rotatably positioned within the housing and wherein the reel retains the lead within the housing.

3. The apparatus of claim 2 and wherein the restraint further comprising a lock for engaging the reel to prevent rotational movement of the reel.

4. The apparatus of claim 1 and wherein the housing further comprises an aperture for positioning digits of a user's hand therethrough.

5. The apparatus of claim 1 and wherein the top portion of the anchor comprises a stop extending from a perimeter of the anchor and wherein the stop retains the housing in a selected position on the upper portion of the anchor.

6. The apparatus of claim 1 and wherein the upper portion and the portion operably connect.

7. The apparatus of claim 1 and wherein the lower portion comprises a helical portion for engaging the ground.

8. The apparatus of claim 1 and wherein the lower portion comprises at least one set of wings attached thereto for positioning into the ground and preventing rotational movement of the anchor.

9. A portable apparatus for tethering an animal in a selected area or for providing a leash to exercise the animal, the apparatus comprising:
an anchor having a bottom portion for positioning into the ground and a top portion for positioning above the ground and a central axis through the top portion; and
a restraint comprising:
a housing having a receptacle;
a reel having a throughbore wherein the receptacle is positioned through the throughbore;
a lead having a proximal end secured to the reel and a distal end for attaching to the animal and wherein the top portion of the anchor is positioned into the receptacle and wherein the reel rotates about the top portion of the anchor; and
a retaining mechanism integral to either the anchor or the restraint for operably and slidably attaching to the housing to the anchor such that the restraint can be utilized as a tether when attached to the anchor or as a handheld restraint when detached from the anchor wherein the top portion comprises an annular groove around a perimeter of the top portion; wherein the housing comprises a latch slidably engaging the housing and having a proximate end extending from an outer surface of the housing and a surface defining a slot proximate a distal end and wherein an engaging portion of the surface defining the slot positions within the receptacle; and a compression spring having a first end engaging the housing and a second end engaging the latch wherein manual force moves the proximal end of the latch toward the housing such that the engaging portion of the surface defining the slot is displaced from the receptacle and wherein when manual force is removed from the latch, the compression spring forces the engaging portion of the surface defining the slot into the annual groove to retain the housing to the upper portion of the anchor.

10. The apparatus of claim 9 and wherein the housing further comprising a lock slidably retained within the housing and wherein the lock engages the reel to prevent rotational movement of the reel.

11. The apparatus of claim 9 and wherein the housing further comprises an aperture for positioning digits of the hand of the user therethrough.

12. The apparatus of claim 9 and wherein the top portion of the anchor comprises a stop extending from a perimeter of the anchor and wherein the housing abuts the stop to position the housing at a selected position on the upper portion of the anchor.

13. The apparatus of claim 9 and wherein the top portion and the bottom portion operably connect.

14. The apparatus of claim 9 and wherein the bottom portion comprises a helical portion for rotatably engaging the ground.

15. The apparatus of claim 9 and wherein the lower portion comprises at least one set of wings attached thereto for positioning into the ground and preventing rotational movement of the anchor.

16. A portable apparatus for tethering an animal in a selected area or for providing a leash to exercise the animal, the apparatus comprising:
an anchor having a bottom portion for positioning into the ground and a top portion for positioning above the ground and a central axis through the top portion;
a restraint comprising a housing having an aperture for accepting the digits of a walker's hand and a receptacle within the housing and wherein the housing is removably and rotatably secured to the anchor by positioning the receptacle of the housing about the anchor such that the housing rotates about an axis of the anchor and wherein the restraint comprises a lead having a proximal end secured within the housing and a distal end for attaching to the animal to tether the animal in a selected position and wherein the restraint being removable form the anchor to provide a hand-held restraint for restraining the animal; and
a retaining mechanism movably attached to the housing for removably and rotatably securing the restraint to the anchor wherein the retaining mechanism comprises a spring loaded latch being slidably retained within the housing and engaging an annular groove in the anchor such that the housing rotatably moves about an axis of the anchor.

* * * * *

UNITED STATES PATENT AND TRADEMARK OFFICE
CERTIFICATE OF CORRECTION

PATENT NO.       : 7,493,873 B2　　　　　　　　　　　　　　　　　　　Page 1 of 1
APPLICATION NO. : 11/478182
DATED            : February 24, 2009
INVENTOR(S)      : Troy Petersen It is certified that error appears in the above-identified patent and that said Letters Patent is hereby corrected as shown below:

Claim 1 - Column 4, lines 40, change "where" to --wherein--

Claim 1 - Column 4, line 62, change "removable" to --removably--

Claim 6 - Column 5, line 17, change "upper" to --top--

Claim 6 - Column 5, line 18, change "the portion" to --the bottom portion--

Claim 7 - Column 5, line 19, change "lower" to --bottom--

Signed and Sealed this

Twenty-sixth Day of May, 2009

JOHN DOLL
*Acting Director of the United States Patent and Trademark Office*